United States Patent
Eder et al.

(10) Patent No.: US 6,885,820 B2
(45) Date of Patent: Apr. 26, 2005

(54) METHOD FOR CONTROLLING THE SIGNAL/NOISE RATIO OF OPTICAL ADD/DROP SIGNALS

(75) Inventors: Christian Eder, Munich (DE); Claus-Jorg Weiske, Furstenfeldbruck (DE)

(73) Assignee: Siemens Aktiengesellschaft, Munich (DE)

(*) Notice: Subject to any disclaimer, the term of this patent is extended or adjusted under 35 U.S.C. 154(b) by 655 days.

(21) Appl. No.: 09/860,106

(22) Filed: May 17, 2001

(65) Prior Publication Data

US 2002/0015199 A1 Feb. 7, 2002

(51) Int. Cl.[7] .................. H04B 10/08; H04J 14/02
(52) U.S. Cl. ................. 398/26; 398/16; 398/25; 398/31; 398/38; 398/83
(58) Field of Search ................. 398/16, 25, 26, 398/31, 38, 83, 27

(56) References Cited

FOREIGN PATENT DOCUMENTS

EP          0 543 570 A2          5/1993

OTHER PUBLICATIONS

End to End Equalization Experiments in Amplified WDM Lightwave Systems, Chraplyvy, p. 426.
Equalization in Amplified WDM Lightwave Transmission Systems, Chraplyvy et al, pp. 920–921.

*Primary Examiner*—M. R. Sedighian
(74) *Attorney, Agent, or Firm*—Bell Boyd & Lloyd LLC

(57) ABSTRACT

A method and apparatus for controlling the signal/noise ratio of optical add/drop signals in an optical WDM transmission system having a transmitter unit, a receiver unit and at least one optical add/drop multiplexer for transmitting optical express signals and at least one optical add/drop signal wherein the power spectrum of the pre-emphasized express signals is determined, and the signal level of the at least one optical add/drop signal is adapted to the power spectrum determined for the express signals.

8 Claims, 2 Drawing Sheets

METHOD FOR CONTROLLING THE SIGNAL/NOISE RATIO OF OPTICAL ADD/DROP SIGNALS

BACKGROUND OF THE INVENTION

1. Field of the Invention

The present invention relates to both a method and an apparatus for controlling the signal/noise ratio of optical add/drop signals of an optical WDM transmission signal in an optical WDM transmission system having a transmitter unit, a receiver unit and at least one optical add/drop multiplexer for transmitting optical express signals and at least one optical add/drop signal. Here, the signal/noise ratios of the express signals are determined in the receiver unit of the WDM transmission system, and the signal levels of the express signals are controlled in the transmitter unit as a function of the signal/noise ratios determined.

2. Description of the Prior Art

In existing and future optical transmission systems, in particular WDM (WDM=Wavelength Division Multiplexing) transmission systems, optical data transmission signals with different wavelengths are used for setting up data connections. At the request of network customers, network operators will make available, for example for a short time, optical logic connections between any desired connecting points within the optical transmission system; i.e., some of the existing optical connections in an optical transmission system have a static character and others have only short service lives.

Cross connectors or through-connecting devices, which have operated electronically, are known for creating such short-term optical connections. Automatically configurable optical through-connecting devices (also referred to as optical add/drop multiplexers (OADM) will, in particular, be provided in the future in the respective concentration points of the communications network in order to utilize the existing network capacities. Using such optical add/drop multiplexers (OADM), one or more WDM channels or WDM signals are removed or dropped from the optical composite signal or WDM transmission signal in the respective concentration points of the communications network, and others are added. Such WDM signals are referred to as local add/drop signals, and WDM signals, which are transmitted from a transmitter unit to a receiver unit over the entire optical transmission path, i.e. at least one optical add/drop multiplexer, are known under the designation express signals.

In order to optimize the optical signal/noise ratio of an optical n×10 Gbit/s transmission path, and thus the optical performance of individual WDM signals, in particular express signals of this kind, the express signals are pre-emphasized at the input of the optical WDM transmission path, i.e. in the transmitter unit, as a function of the properties of the optical WDM transmission path, in particular of the nonlinear properties, and of the optical repeaters, in terms of their signal power with attenuators in such a way that the optical signal/noise (OSNR) ratio has an optimized value at the end, i.e. in the receiver unit, of the optical WDM transmission path. An optimized signal/noise ratio for all the optical WDM signals, in particular the express signals, has the same value or the same amplitude for each WDM signal. The transmitter variance, for example that of the optical transmission signal, are compensated within the optical transmission system by such compensation of the different optical path properties on an individual basis for the respective WDM signal. For this purpose, methods for controlling the signal/noise ratio of express signals are known, in particular from the publication by A. R. Chraplyvy, et. al. "End to end equalization experiments in amplified WDM light wave systems", IEEE Photonics Technology Letters, Vol. 4, No. 4, April 1993 and from "Unequalization in amplified WDM light wave transmissions systems", IEEE Photonics Technology Letters, Vol. 4, No. 8, August 1992, and from the European Patent Application 92310342.8.

In such methods, the signal/noise ratio is controlled, in each case, by the attenuation of the signal power of the express signals at the start of the optical WDM transmission path; i.e., in the transmitter unit. However, such methods are not suitable for the automatic signal/noise ratio control of local add/drop signals, which are added to the optical composite signal in, for example, an optical add/drop multiplexer; i.e., the automatic control as in the case of the express signals cannot be carried out in accordance with the known methods.

For this reason, in previous transmission systems with transmission rates of 2.5 Gbit/s and add/drop functionality, local add/drop signals are injected at the injection point, i.e. in the transmitter unit or in the add/drop multiplexer, with a permanently predefined signal level. This permanently predefined signal level is selected such that the nonlinear effects occurring during the transmission of optical signals, for example the stimulated Raman scattering or the cross-phase modulation, in the optical fiber are kept low. Furthermore, all the incoming WDM signals are amplified in accordance with the received signal power via the optical fiber repeaters provided in the optical transmission system, but the signal noise added by the amplification is independent of the received signal strength here, which leads to a degradation of the signal/noise ratio OSNR for WDM signals having a low signal power. However, in optical transmission systems with data transmission rates higher than 10 Gbit/s, the optical signal/noise ratio is decisive, in particular for the transmission path length which can be spanned without regeneration, so that to operate such high-bit-rate optical transmission systems it is necessary to optimize the optical signal/noise ratio of the locally injected add/drop signals.

An object to which the present invention is directed, therefore, is to optimize the optical signal/noise ratio of local add/drop signals or disclosing a control method with which the optimum optical signal/noise ratio of local add/drop signals can be set.

SUMMARY OF THE INVENTION

Accordingly, pursuant to the teachings of the present invention, the power spectrum of the express signals is determined, and the signal level of the at least one optical add/drop signal is adapted to the power spectrum determined for the express signals. The power spectrum of the optical WDM transmission signal is advantageously determined at the output of the optical transmitter unit or of the optical add/drop multiplexer using an optical spectrum analyzer, and the signal level of the injected add/drop signals is adapted to the power spectrum determined for the express signals, at the input of the optical transmitter unit or of the optical add/drop multiplexer. As a result, the optical WDM transmission signal which is emitted by the optical transmitter unit and/or leaves the optical add/drop multiplexer and is acquired using the method according to the present invention has, in a particularly advantageous way, an optimum pre-emphasis which is necessary to implement an optimum signal/noise ratio in the receiver unit. As a result of the signal level optimization according to the present invention, it is possible to increase the transmission range both for the express signals and for the add/drop signals without electrical regeneration of the optical WDM transmission signal.

A further advantage of the method according to the present invention is the fact that the adaptation of the signal level of the at least one add/drop signal is carried out in the transmitter unit and/or in the add/drop multiplexer via extrapolation or interpolation of the power spectrum respectively determined for the express signals. As a result of the extrapolation or interpolation of the power spectrum respectively determined for the express signals, the signal level of the at least one add/drop signal is easily set in such a way that the power spectrum of the at least one add/drop signal which is injected into the WDM transmission signal is inserted in an optimum way in terms of amplitude and phase into the power spectrum determined for the express signals.

In addition, according to the present invention, in order to adapt the signal level of an add signal in the at least one add/drop multiplexer, the insertion loss for an express signal is calculated and the signal level of a drop signal is measured, and the signal level of the added signal necessary for the adaptation to the power spectrum of the express signals is determined from the calculated insertion loss for an express signal and from the measured signal level of the added signal and is set before the injection into the WDM transmission signal. In order to dispense with the costly and sensitive optical spectrum analyzer in the add/drop multiplexers, the adaptation of the signal level of the add signal which is to be injected can be carried out in such a way that initially, for example when the product is manufactured, the insertion loss of the optical components for drop signals and add signals in the optical add/drop multiplexer is determined and the insertion loss for an express signal in the optical add/drop multiplexer is calculated. Furthermore, the signal level of a drop signal extracted in the optical add/drop multiplexer is measured at the drop output of the optical add/drop multiplexer and the signal level of the add signal which is necessary for the adaptation to the power spectrum of the express signals is determined from the calculated insertion loss and from the measured signal level of the drop signal. The signal level of the add signal which is to be injected is adapted to the necessary signal level determined, and the add signal with the adapted signal level is injected into the optical WDM transmission signal. In the method according to the present invention, the signal level is adapted incrementally to the power spectrum of the express signals for a number of add signals.

The present invention particularly advantageously discloses a further variant for controlling the signal/noise ratio in the add/drop multiplexer. In this variant, in order to incrementally adapt the signal levels of at least one add signal, initially an add/drop signal, in addition to the express signals, the ratio is transmitted to the at least one add/drop multiplexer and the percentage signal power change in the optical WDM transmission signal which is brought about in the at least one add/drop multiplexer by the one add/drop signal is determined before the extraction of the add/drop signal. Subsequently, the signal level of the add signal is set before the injection into the optical WDM transmission signal in such a way that the ratio of the signal power of the WDM transmission signal before the injection of the add signal to the signal power of the WDM transmission signal after the extraction of the add/drop signal and after the injection of the add signal corresponds to the percentage signal power change determined. Using this further variant of the method according to the present invention, it is possible to dispense with a costly and sensitive optical spectrum analyzer in the respective add/drop multiplexers. For this purpose, the adaptation of the signal level of the add signal which is to be injected will be carried out in such a way that the individual add signals are adapted incrementally. For this purpose, an add/drop signal, in addition to the optimally pre-emphasized express signals, is also initially transmitted, and at the input of the at least one add/drop multiplexer the percentage signal power change in the optical WDM transmission signal which is brought about by the add/drop multiplexer is measured before the extraction or drop point, with a cost-effective monitor diode, for example. In addition, the signal level of the add signal is set before the injection into the optical WDM transmission signal using an adjustable attenuator in such a way that the ratio of the signal power of the injected add signal to the signal power of the WDM transmission signal transmitted by the add/drop multiplexer after the extraction of the add/drop signal corresponds to the measured percentage signal power change. For this purpose, the signal power of the WDM transmission signal is determined at the output of the add/drop multiplexer, and the signal power of the add signal is determined at the add input of the add/drop multiplexer using, in each case, a further monitor diode, for example, and the ratio of the signal powers is formed and compared with the percentage signal power change determined before the drop point. The signal level of the add signal is subsequently controlled in such a way that the ratio of the signal power of the WDM transmission signal to the signal power of the add signal corresponds to the percentage signal power change determined.

Furthermore, according to the present invention, at least a portion of the optical WDM transmission signal is particularly advantageously extracted at the output of the transmitter unit and/or at the output of the add/drop multiplexer, respectively, in order to determine the power spectrum of the express signals. Using an optical tap coupler, a low percentage portion of the respective optical signal to be measured is advantageously extracted and the signal properties determined by reference to it.

According to the present invention, the adaptation of the signal level of the add/drop signal or of the add signal or of the drop signal is particularly advantageously carried out using an adjustable attenuator. The signal level of the add/drop signals is advantageously attenuated using a cost-effective and adjustable attenuator. The control signal necessary for this does not need to satisfy any high quality requirements and, thus, can be determined from the respective measured signal without any considerable switching effort.

Furthermore, the add/drop signals which are to be extracted and/or injected are indicated to the at least one add/drop multiplexer via the transmitter unit and the receiver unit using a network management system and the add/drop signals which are extracted and/or injected are indicated to the transmitter unit and to the receiver unit via the at least one add/drop multiplexer using an optical signaling signal. Accordingly, the control processes according to the present invention are automated and it is possible to monitor using the network management system.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
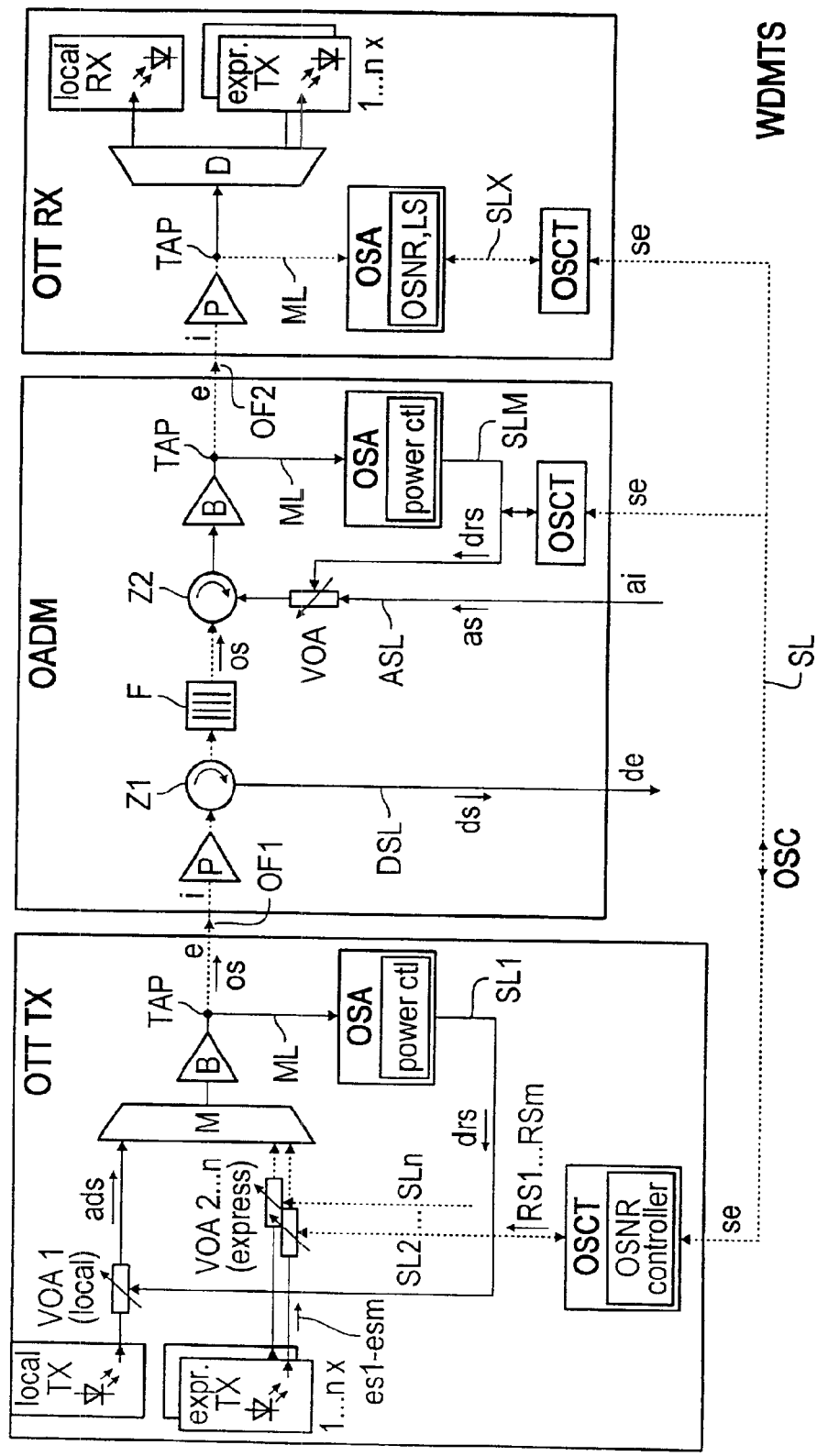
FIG. 1 shows a basic circuit diagram of an optical WDM transmission system with the control according to the present invention of the signal/noise ratio of optical add/drop signals.

FIG. 1 is a basic circuit diagram illustrating an optical WDM transmission system WDMTS which has an optical transmitter unit OTT TX, an optical add/drop multiplexer OADM and an optical receiver unit OTT RX. A multiplexer M, a booster B, an optical spectrum analyzer OSA and an optical signaling unit OSCT are provided in the optical transmitter unit OTT TX. Furthermore, the optical transmitter unit OTT TX has a local optical transmitter and an optical express transmitter localTX, expressTX for generating local optical add/drop signals and optical express signals. The local optical transmitter localTX is connected via a first optical adjustable attenuator VOA1 to an input of the multiplexer M. The outputs of the optical express transmitter expressTX are connected, in each case, via a second to n-th optical adjustable attenuator VOA2 to VOAn to an input of the multiplexer M. The output of the multiplexer M is connected to the booster B which is connected to the output e of the optical transmitter unit OTT TX. Furthermore, the input of the optical spectrum analyzer OSA is connected to the output of the booster B, and its output is connected to the first optical adjustable attenuator VOA1 via a first signaling line SL1.

The signaling unit OSCT is connected via a second to n-th signaling line SL2 to SLn to the second to n-th optical adjustable attenuators VOA2 to VOAn. Furthermore, the signaling unit OSCT is connected via an external signaling line SL to the signaling units OSCT of the optical add/drop multiplexer OADM and of the optical receiver unit OTT RX.

The optical add/drop multiplexer OADM has, for example, an optical pre-amplifier P, a first circulator Z1, an optical filter F, a second circulator Z2, an optical booster B as well as an optical spectrum analyzer OSA and a signaling unit OSCT, the optical pre-amplifier P which is connected to the input i of the optical add/drop multiplexer OADM being connected via a connecting line to the first circulator Z1, and the first circulator Z1 being connected to the input of the optical filter F. The optical filter F is connected to the second circulator Z2 which is connected to the input of the optical booster B. The output of the optical booster B is connected to the output e of the optical add/drop multiplexer OADM. A tap coupler TAP, which is connected via a measuring line ML to the input of the optical spectrum analyzer OSA, is connected between the optical booster B and the output e of the optical add/drop multiplexer OADM. The output of the optical spectrum analyzer OSA is connected via a control line SLM both to the signaling unit OSCT and to an adjustable optical attenuator VOA which is connected to the second circulator Z2. The input of the adjustable optical attenuator VOA is connected to the add input ai of the optical add/drop multiplexer OADM. Furthermore, the drop output de of the optical add/drop multiplexer OADM is connected to an input of the first circulator Z1.

The optical receiver unit OTT RX has an optical pre-amplifier P, an optical demultiplexer D as well as a signaling unit OSCT and an optical spectrum analyzer OSA. An optical local receiver localRX and an optical express receiver expressRX which has a number of inputs are connected to the outputs of the optical demultiplexer D. The input of the optical demultiplexer D is connected via a tap coupler TAP to the output of the optical pre-amplifier P to whose input the input i of the optical receiver unit OTT RX is connected. The input of the optical spectrum analyzer OSA is connected to the tap coupler TAP via a measuring line ML. The output of the optical spectrum analyzer OSA is connected to the input of the signaling unit OSCT. The signaling output se of the optical receiver unit OTT RX is connected to the output of the signaling unit OSCT. The signaling output se of the optical receiver unit OTT RX is connected via the external signaling line S1 to the signaling units OSCT of the optical transmitter unit OTT TX and of the optical add/drop multiplexer OADM.

Furthermore, the output e of the optical transmitter unit OTT TX is connected to the input i of the optical add/drop multiplexer OADM via, for example, a first optical fiber OF1, and the output e of the optical add/drop multiplexer OADM is connected to the input i of the optical receiver unit OTT RX via a second optical fiber OF2.

When the optical WDM transmission system WDMTS is activated, initially first m-th optical express signals es1 to esm are transmitted from the optical transmitter unit OTT TX to the optical receiver unit OTT RX via the optical add/drop multiplexer OADM. In the process, the optical express signals es1 to esm are combined using the multiplexer M to form an optical WDM transmission signal os and, after amplification, for example using the booster B, they are directed to the output e of the optical transmitter unit OTT TX.

The optical WDM transmission signal os is transmitted to the optical add/drop multiplexer OADM via the first optical fiber OF1. At the input i of the optical add/drop multiplexer OADM, the optical WDM transmission signal os is amplified using, for example, an optical pre-amplifier P, and transmitted to the first circulator Z1. Local optical add/drop signals ads, in particular drop signals ds, are selectively filtered or extracted from the optical WDM transmission signal or optical composite signal os using the optical filter F which is connected downstream of the first optical circulator Z1. Here, the extraction is carried out using the optical filter F in such a way that the wavelength of the optical drop signal ds which is to be extracted is reflected via the optical filter F, and the optical drop signal ds is thus reflected to the output of the first optical circulator Z1. The reflected optical drop signal ds is deflected to the optical drop signal line DSL, and ultimately to the optical drop output de of the optical add/drop multiplexer OADM using the first circulator Z1. The optical express signals es1 to esm of the optical WDM transmission signal os pass through the filter F and are transmitted to the second optical circulator Z2. Optical add signals ads can be added to the optical WDM transmission signal and/or the optical composite signal os and/or injected into the optical composite signal os using the second optical circulator Z2. For this purpose, the optical add signal ads which is present at the optical add input ai of the optical add/drop multiplexer OADM is directed to the input of the second optical circulator Z2 via the adjustable optical attenuator VOA and inserted into the optical WDM composite signal os via the second optical circulator Z2. The optical WDM transmission signal os which is present at the output of the second optical circulator Z2 is transmitted, for example, to the booster B, amplified by it and fed via the optical tap coupler TAP to the output e of the optical add/drop multiplexer OADM.

From the output e of the optical add/drop multiplexer OADM, the optical WDM transmission signal os is transmitted via the second optical fiber OF2 to the input i of the optical receiver unit OTT RX. The optical WDM transmission signal os which is received at the input i of the optical receiver unit OTT RX is preamplified, for example using the optical pre-amplifier P, and transmitted to the input of the optical demultiplexer D via the TAP coupler TAP. In the optical demultiplexer D, the optical WDM transmission signal os or optical composite signal os is split into the individual express signals es1 to esm and passed on to the respective optical express receivers expressRX. Using the tap coupler TAP arranged in the optical receiver unit OTT RX, a portion of the optical composite signal or WDM transmission signal os is extracted, for example, and transferred via the measuring line ML to the optical spectrum analyzer OSA. In the optical spectrum analyzer OSA, the power spectrum LS of the express signals es1 to esm is determined and the signal/noise ratios OSNR of the express signals es1 to esm are determined on the basis of the power spectrum LS determined for the express signals es1 to esm. The signal/noise ratios OSNR of the express signals es1 to esm are transferred via a control line SLX to the signaling unit OSCT, which evaluates the signal/noise ratios OSNR and integrates the acquired information into an optical signaling signal OSC. The optical signaling signal OSC which is generated in the signaling unit OSCT is transmitted via the external signaling line SL to the further signaling units OADM in the optical WDM transmission system WDMTS and/or to the optical transmitter unit OTT TX and to the optical add/drop multiplexer OADM.

The optical signaling signal OSC which is received in the optical transmitter unit OTT TX and/or in the signaling unit OSCT is evaluated in the signaling unit OSCT using an optical signal/noise ratio controller OSNRcontroller and control signals RS1 to RSm for controlling the second to n-th optical adjustable attenuators VOA2 to VOAn which are connected to the optical express transmitters expressTX are generated. The control signals RS1 to RSm are formed on a signal-specific basis for controlling the respective optical adjustable attenuators VOA2 and VOAn and transferred to the second to n-th optical adjustable attenuators VOA2 to VOAn which are connected to the signaling unit OSCT via a control line RL in each case. Using the second to n-th optical adjustable attenuators VOA2 to VOAn, the signal level of the optical express signals es1 to esm is attenuated in such a way that the optical signal power spectrum LS of the express signals es1 to esm measured in the optical receiver unit OTT RX and/or the signal/noise ratios OSNR of the express signals es1 to esn are optimum. Via this pre-emphasis of the signal power of the express signals es1 to esm in the optical transmitter unit OTT TX using the second to n-th optical adjustable attenuators VOA2 to VOAn, the signal/noise ratio OSNR of the express signals es1 to esm is set in such a way that both the different path properties and the optical transmitter variance can be compensated by them.

According to the present invention, optical add/drop signals or local optical signals ads are also transmitted, in addition to the express signals es1 to esm, from the optical transmitter unit OTT TX to, for example, the optical add/drop multiplexer OADM or from the optical add/drop multiplexer OADM to the optical receiver unit OTT RX. For this purpose, the local optical transmitter localTX in the optical transmitter unit OTT TX is used to generate a local optical add/drop signal ads and transmit it to an input of the multiplexer M via the first optical adjustable attenuator VOA1. The local optical add/drop signal ads is combined with the express signals es1 to esm to form an optical WDM transmission signal os using the multiplexer M and is transmitted from the output of the multiplexer M to the optical booster B via which the optical WDM transmission signal os is amplified. After the amplification, the optical WDM transmission signal os is transmitted via the tap coupler TAP to the output e of the optical transmitter unit OTT TX.

In order to control the signal/noise ratio OSNR of the optical add/drop signal ads within the optical WDM transmission system WDMTS or the optical WDM transmission signal os, a portion of the optical WDM transmission signal os, for example, is extracted using the tap coupler TAP and transmitted to the optical spectrum analyzer OSA via a measuring line ML. In the spectrum analyzer OSA, the power spectrum LS of the optical WDM transmission signal os or of the optical express signals es1 to esm and of the optical add/drop signal ads is determined using a power controller power ct1 and on the basis of this an attenuation control signal drs is formed for controlling the first optical adjustable attenuator VOA1, and thus the signal level of the optical add/drop signal ads. In the optical spectrum analyzer OSA, the power or the signal level of the optical add/drop signal ads is determined using the power controller power ct1 and adjusted, via extrapolation or interpolation, to the power value resulting from the power spectrum LS additionally determined for the express signals es1 to esm; i.e., the signal level of the optical add/drop signal ads is adapted to the signal levels of the express signals es1 to esm in such a way that a uniform power spectrum LS for the optical WDM transmission signal os is obtained. The attenuation control signal drs which is determined in this way is transmitted to the first optical adjustable attenuator VOA1 from the optical spectrum analyzer OSA via the first control line SL1. The attenuation properties of the optical adjustable attenuator VOA1 are varied by the attenuation control signal drs, and the signal level of the optical add/drop signal ads is thus changed before the combination with the express signals es1 to esm using the multiplexer M until the power spectrum LS determined via the optical spectrum analyzer OSA has uniform power values for the different express signals or add/drop signals es1 to esm, ads.

Analogously, in the optical add/drop multiplexer OADM, the signal level of the add signals as is, according to the present invention, adapted before the injection into the WDM transmission signal os, using the second circulator Z2, to the power spectrum LS determined for the express signals es1 to esm. For this purpose, a portion of the optical WDM transmission signal os is in turn extracted, for example using the tap coupler TAP, before being passed on to the output e of the optical add/drop multiplexer OADM and transmitted to the optical spectrum analyzer OSA via the measuring line ML. In the optical spectrum analyzer OSA, the power spectrum LS of the optical WDM transmission signal os or of the optical express signals es1 to esm and of the optical add/drop signal ads is determined in a way analogous to the optical transmitter unit OTT TX using a power controller power ct1, and an attenuation control signal drs for controlling the adjustable optical attenuator VOA, and thus the signal level of the optical add signal as is formed on the basis thereof. In the optical spectrum analyzer OSA, the power or the signal level of the optical add signal as is determined using the power controller power ct1 and adjusted via extrapolation or interpolation to the power value resulting from the power spectrum LS additionally determined for the express signals es1 to esm; i.e., the signal level of the optical add signal as is adapted to the signal levels of the express signals es1 to esm in such a way that a uniform power spectrum LS is obtained for the optical WDM transmission signal os. The attenuation control signal drs which is determined in this way is transmitted from the optical spectrum analyzer OSA via the second control line SL2 to the adjustable optical attenuator VOA and to the signaling unit OSCT. The attenuation properties of the optical adjustable attenuator VOA are varied by the attenuation control signal drs, and the signal level of the optical add signal ads or as is thus changed before the injection into the WDM transmission signal os using the second circulator Z2 until the power spectrum LS determined by the optical spectrum analyzer OSA has uniform power values for the different express signals and the add signal es1 to esm, ads or as.

Figure 2:
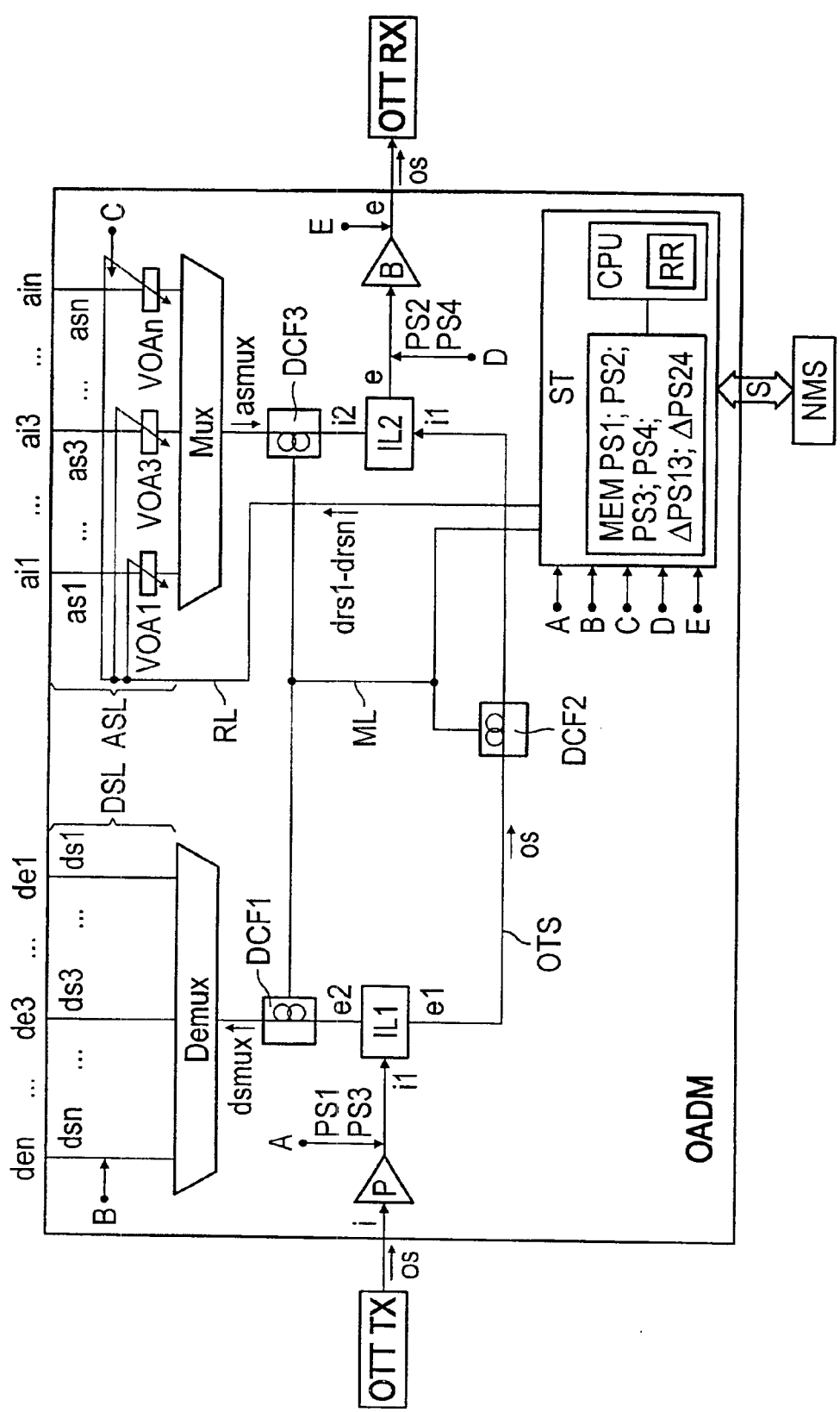
FIG. 2 shows, by way of example, an optical add/drop multiplexer in a further basic circuit diagram.

FIG. 2 is a further basic circuit diagram illustrating, by way of example, an optical add/drop multiplexer OADM in which further variants of the method of the present invention for controlling the signal/noise ratio OSNR of add/drop signals ads, in particular in an add/drop multiplexer OADM, are implemented. The optical add/drop multiplexer OADM has, by way of example, a multiplexer Mux, a demultiplexer Demux, a control unit ST and a first to third dispersion compensation unit DCF1 to DCF3 and a first and second interleaver IL1, IL2 having outputs and inputs. Furthermore, the optical add/drop multiplexer OADM has an input i, an output e and one to n-th drop signal outputs de1 to den, and one to n-th add signal inputs ai1 to ain.

The input i of the optical add/drop multiplexer OADM is connected to the input of an optical pre-amplifier P which is connected to the first input i1 of the first interleaver IL1. The first output e1 of the first interleaver IL1 is connected via an optical transmission fiber OTS to the second dispersion compensation unit DCF2, and ultimately to the first input i1 of the second interleaver IL2. The second output e2 of the first interleaver IL1 is connected via the first dispersion compensation unit DCF1 to the input of the demultiplexer Demux whose outputs are connected via drop signal lines DSL to, in each case, one drop signal output de1 to den of the optical add/drop multiplexer OADM.

The second input i2 of the second interleaver IL2 is connected via the third dispersion compensation unit DCF3 to the output of the multiplexer M, in each case one input of the multiplexer M being connected to one output of one of the first to n-th adjustable optical attenuators VOA1 to VOAn. The input of the first to n-th adjustable optical attenuators VOA1 to VOAn is connected to one of the one to n-th add signal inputs ai1 to ain via in each case one add signal line ASL. In addition, the first to n-th adjustable optical attenuators VOA1 to VOAn are connected via control lines RL to the control unit ST. A booster B is connected to the output of the second interleaver IL2, and the output of the booster is connected to the output e of the optical add/drop multiplexer OADM.

An arithmetic unit CPU and a storage unit MEM are provided in the control unit ST, a control routine RR being carried out in the arithmetic unit CPU. Furthermore the first to third dispersion compensation units DCF1 to DCF3 are connected to the control unit ST via measuring lines ML and first to fifth measuring points A to E, for example, which are arranged in the optical add/drop multiplexer OADM are provided for implementing the method of the present invention. At the measuring points, a portion of the WDM transmission signal os is extracted, for example using a tap coupler TAP (not illustrated in FIG. 2), and the signal properties, in particular the signal power or the signal level, of the WDM transmission signal os are determined using, for example, a monitor diode (not illustrated in FIG. 2). The first to fifth measuring points A to E are connected to the control unit ST, in each case via measuring points ML (indicated by tap points in FIG. 2), the first measuring point A between the pre-amplifier P and the first input of the first interleaver IL1, and the second measuring point B at, for example, the n-th output of the demultiplexer Demux, being selected. The third measuring point C is located, for example, between the n-th add signal input ain and the input of the n-th adjustable optical attenuator VOAn. The fourth measuring point D is selected, for example, between the output e of the second interleaver IL2 and the booster B, and the fifth measuring point E is provided, for example, between the booster B and the output e of the optical add/drop multiplexer OADM.

In the same way as in FIG. 1, the WDM transmission signal os, which is transmitted for example by the optical transmitter unit OTT TX and is transmitted to the pre-amplifier P in the optical add/drop multiplexer OADM for pre-amplification, is also present at the input i of the optical add/drop multiplexer OADM in FIG. 2. At the first measuring point A adjoining the pre-amplifier P, a first signal power or the first signal level PS1 of the optical WDM transmission signal os is determined, for example using a monitor diode, the optical WDM transmission signal os initially having only optical express signals es1 to esm. The measured first signal power PS1 is transmitted to the control unit ST via a measuring line ML and stored there in the storage unit MEM. Furthermore, a second signal power PS2 of the optical WDM transmission signal os is measured at the fourth measuring point D, there being no injection of add signals as1 to asn via the multiplexer M and using the second interleaver IL2. The measured second signal power PS2 of the optical WDM transmission signal os is transferred to the control unit ST and stored in the storage unit MEM.

According to the present invention, in the following method step, an optical add/drop signal ads is added, in addition to the express signals es1 to esn, to the optical composite signal or optical WDM transmission signal os, in, for example, the optical transmitter unit OTT RX, in particular using the method illustrated in FIG. 1, and the optical add/drop signal ads is transmitted to the optical add/drop multiplexer OADM.

In the optical add/drop multiplexer OADM, a third signal power PS3 of the optical WDM transmission signal os is determined at the first measuring point A and indicated to the control unit ST via a measuring line ML, and stored in the storage unit MEM. In the storage unit ST, the first and third signal powers PS1, PS3, which are measured at the first measuring point A, are loaded from the storage unit MEM in accordance with a control routine RR running in the central processor unit CPU, and the first percentage signal power change ΔPS13 which is brought about by the addition of an add/drop signal is determined.

Furthermore, according to the present invention, an add signal asn, for example the n-th add signal, is added to the optical composite signal or the WDM transmission signal os via the multiplexer M and using the second interleaver IL2. A fourth signal power PS4 of the optical WDM transmission signal os is then measured at the fourth measuring point D after the extraction of the add/drop signals ads using the first interleaver IL1 and after the injection of, for example, the n-th add signal asn into the optical WDM transmission signal os via the second interleaver IL2. The measured fourth signal power PS4 is indicated to the control unit ST and stored in the storage unit MEM. In the storage unit ST, the second and fourth signal powers PS2, PS4, which are measured at the fourth measuring point D, are loaded from the storage unit MEM in accordance with the control routine RR running in the central processor unit CPU, and the second percentage signal power change ΔPS24, which is brought about by the injection of the n-th add signal asn, is determined.

According to the control routine RR, a first level ratio V1 is determined in the central processor unit CPU of the control unit ST from the first signal power change ΔPS13 and the first signal power PS1, and a second level ratio V2 is determined from the second signal power change ΔPS24 and the second signal power PS2. The first and second level ratios V1, V2 are compared with one another in accordance with the control routine RR. Given optimum adaptation of the signal level of the n-th add signal asn to the power spectrum LS of the express channels es1 to esm, the first and second level ratios V1, V2 correspond. If optimum adaptation does not occur, the signal power, for example of the n-th add signal asn, is adapted using the n-th adjustable optical attenuator VOAn in such a way that the second level ratio V2 and the first level ratio V1 assume the same value. In order to control the n-th attenuator VOAn, an n-th attenuation control signal drsn is formed in control unit ST according to the control routine RR and is transmitted to the adjustable optical attenuator VOAn via the control lines RL. In a way analogous to the procedure described, the signal levels of the add/drop signals or add signals as1 to asn are incrementally adapted to the power spectrum LS of the express channels es1 to esm without using a costly spectrum analyzer OSA, and the signal/noise ratio OSNR of the add/drop signals ads are thus optimized, for example in the optical receiver unit OTT RX.

According to a further refinement of the method according to the present invention, when the optical add/drop multiplexer OADM is set up, the insertion loss of the demultiplexer Demux, the multiplexer Mux, and the first and second interleavers IL1, IL2, is determined; i.e., from the first measuring point A to the second measuring point B and from the third measuring point C to the fourth measuring point D. The insertion losses determined are stored as system parameters in the storage unit MEM of the control unit ST. The insertion loss of the first to third dispersion compensation units DCF1 to DCF3 is indicated to the control unit ST via the measuring lines ML. Furthermore, the insertion loss of the optical add/drop multiplexer OADM is determined per se, i.e. from the first measuring point A to the fourth measuring point D, in such a way that the insertion loss for the WDM transmission signal os containing only express signals es1 to esm is determined via two signal power measurements at the first and fourth measuring points A, D using monitor diodes, for example. For this purpose, first and second signal powers PS1, PS2 of the WDM transmission signal os containing only express signals es1 to esn are determined at the first measuring point A and at the fourth measuring point D and indicated to the control unit ST as well as being stored in the storage unit MEM. The insertion loss of the optical add/drop multiplexer OADM is calculated using the control routine running in the central processor unit CPU, via the first and second signal powers PS1, PS2 stored in the storage unit MEM.

The add/drop signals ads are then added to the optical WDM transmission signal os, for example in the optical transmitter unit OTT TX. In the optical add/drop multiplexer OADM, the drop signals ds1 to dsn which are provided are extracted using the first interleaver IL1, as a demultiplexed drop signal dsmux, for example, and split by the demultiplexer Demux into the one to n-th drop signals ds1 to dsn and conducted via the outputs of the demultiplexer Demux to the one to n-th drop signal outputs de1 to den. In an analogous fashion, in the optical add/drop multiplexer OADM, the one to n-th add signals as1 to asn which are present at the one to n-th add signal inputs ai1 to am are transmitted to the optical multiplexer Mux via one of the one to n-th attenuators VOA1 to VOAn, combined to form a multiplexed add signal asmux, and the multiplexed add signal asmux is injected into the optical WDM transmission signal os using the second interleaver IL2.

In order to control the signal power of the one to n-th add signals as1 to asn using the one to n-th adjustable optical attenuators VOA1 to VOAn, the signal power or the signal level of the extracted drop signal ds1 to dsn is determined at the second measuring point B using monitor diodes (not illustrated in FIG. 2) and indicated to the control unit ST; i.e., the signal levels of the respective drop signals ds1 to dsn are present in the control unit ST, stored in the storage unit MEM. Attenuation control signals drs1 to drsn for controlling the one to n-th attenuators VOA1 to VOAn are calculated and formed via the stored drop signal levels and the stored insertion losses of the components due to the system, and of the add/drop multiplexer OADM per se, using the control routine RR, and transferred to the attenuators VOA1 to VOAn via the control lines RL. Here, the signal level of the one to n-th add signals as1 to asn is attenuated in such a way that the signal levels of the extracted one to n-th drop signals ds1 to dsn are compensated, taking into account the insertion losses of the optical add/drop multiplexer OADM, via signal levels of the injected one to n-th add signals as1 to asn, and as a result a uniformly distributed, optimized power spectrum LS is obtained for the optical WDM transmission signal. That is, the signal level which is necessary for the adaptation of the signal levels of the add signals as1 to asn to the power spectrum LS of the express signals es1 to esm is determined via the control unit ST and set using the adjustable optical attenuators VAO1 to VOAn before the injection into the optical WDM transmission signal os.

FIG. 2 illustrates, by way of example, an interface S between the optical add/drop multiplexer OADM or the control unit ST, respectively, and a network management system, via which interface S the add/drop signals es1 to esn, ds1 to dsn which are to be extracted and injected are indicated to the optical add/drop multiplexer OADM via the optical transmitter unit OTT TX and via the optical receiver unit OTT RX.

Furthermore, the extracted add/drop signals es1 to esn, ds1 to dsn are indicated via the optical add/drop multiplexer OADM (see FIG. 1 in this regard) via the external signaling power SL, connected to the signaling unit OSCT, both of the optical transmitter unit OTT TX and of the optical receiver unit OTT RX.

The optical add/drop multiplexers OADM illustrated in FIGS. 1 and 2 are examples of the technical implementation of an add/drop functionality. The add/drop process can, of course, be carried out via a wide variety of technical or physical ways which are not explicitly represented in the exemplary embodiments.

Although the present invention has been described with reference to specific embodiments, those of skill in the art will recognize that changes may be made thereto without departing from the spirit and scope of the invention as set forht in the hereafter appended claims.

We claim as our invention:

1. A method for controlling a signal to noise ratio of optical add/drop signals of an optical WDM transmission signal in an optical WDM transmission system having a transmitter unit, a receiver unit and at least one optical add/drop multiplexer for transmitting both optical express signals and at least one optical add/drop signal, the method comprising the steps of:

determining signal to noise ratios of the express signals in the receiver unit;

controlling signal levels of the express signals in the transmitter unit as a function of the determined signal to noise ratios of the express signals;

determining a power spectrum of the express signals;

adapting a signal level of the at least one optical add/drop signal to the power spectrum determined for the express signals;

calculating, prior to the step of adapting, an insertion loss for at least one of the express signals;

measuring a signal level of a drop signal; and determining a signal level of an add signal, necessary for the step of adapting, from both the calculated insertion loss and the measured signal level of the drop signal, and setting the signal level of the add signal before injection into the WDM transmission signal.

2. A method for controlling a signal to noise ratio as claimed in claim 1, wherein the step of adapting the signal level of the at least one add/drop signal is carried out in at least one of the transmitter unit and the add/drop multiplexer via one of extrapolation and interpolation of the power spectrum determined for the express signals.

3. A method for controlling a signal to noise ratio as claimed in claim 1, wherein, in order to incrementally adapt the signal levels of at least one add signal, one of the at least one add/drop signals is transmitted, in addition to the express signals, to the at least one add/drop multiplexer, a percentage signal power change in the optical WDM transmission signal which is brought about in the at least one add/drop multiplexer by the one of the at least one add/drop signal is determined before the extraction of the at least one add/drop signal, and the signal level of the at least one add signal is set before injection into the optical WDM transmission signal such that a ratio of the signal power of the WDM transmission signal before the injection of the at least one add signal to the signal power of the WDM transmission signal after the extraction of the one add/drop signal and after the injection of the at least one add signal corresponds to the percentage signal power change determined.

4. A method for controlling a signal to noise ratio as claimed in claim 1, the method further comprising the step of:

extracting, in order to determine the power spectrum of the express signals, at least a portion of the optical WDM transmission signal at an output of at least one of the transmitter unit and the add/drop multiplexer.

5. A method for controlling a signal to noise ratio as claimed in claim 1, wherein the adaptation of the signal level of at least one of the at least one add/drop signal, the at least one add signal and the drop signal is carried out using an adjustable attenuator.

6. A method for controlling a signal to noise ratio as claimed in claim 1, wherein the at least one add/drop signals to be at least one of extracted and injected are indicated to the at least one add/drop multiplexer via the transmitter unit and the receiver unit using a network management system.

7. A method for controlling a signal to noise ratio as claimed in claim 1, wherein the at least one add/drop signals to be at least one of extracted and injected are indicated to both the transmitter unit and the receiver unit via the at least one add/drop multiplexer using an optical signaling signal.

8. An apparatus for controlling a signal to noise ratio of optical add/drop signals of an optical WDM transmission signal in an optical WDM transmission system, comprising: a transmitter unit; a receiver unit; and at least one optical add/drop multiplexer for transmitting both optical express signals and at least one optical add/drop signal, said add/drop signal having a measured signal level; wherein an insertion loss for at least one of the express signals is calculated, for the at least one multiplexer optical add/drop multiplexer, and wherein the signal to noise ratios of the express signals are determined in the receiver unit, and signal levels of the express signals are controlled in the transmitter unit as a function of the determined signal to noise ratios of the express signals, a power spectrum of the express signals is determined, and an add signal level is calculated for adapting to the power spectrum for the express signals, said add signal level being calculated from both the calculated insertion loss and the measured signal level of the drop signal, wherein the signal level of the add signal is set before injection into the WDM transmission signal.

\* \* \* \* \*